United States Patent Office 3,660,366
Patented May 2, 1972

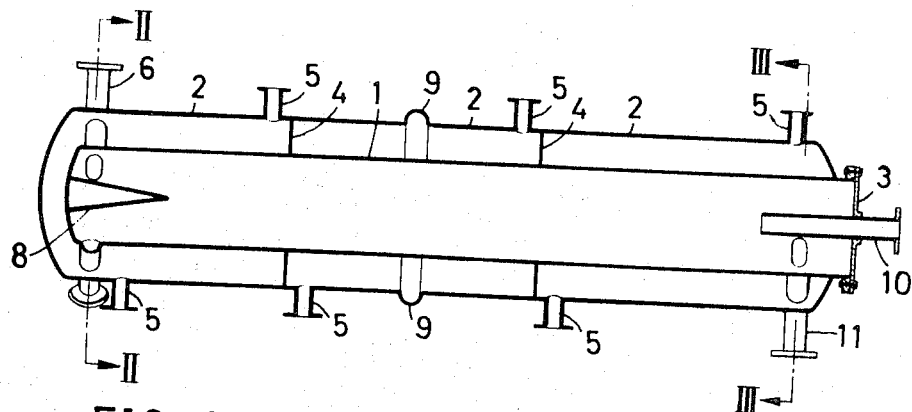
FIG. 1
FIG. 2     FIG. 3
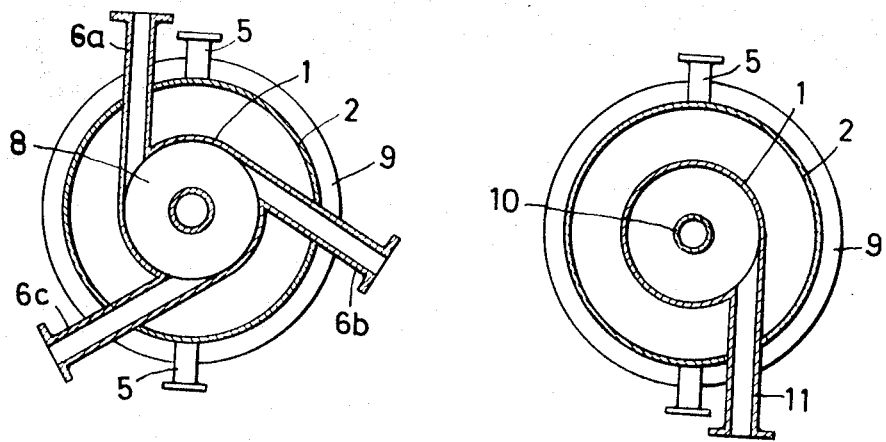
FIG. 4
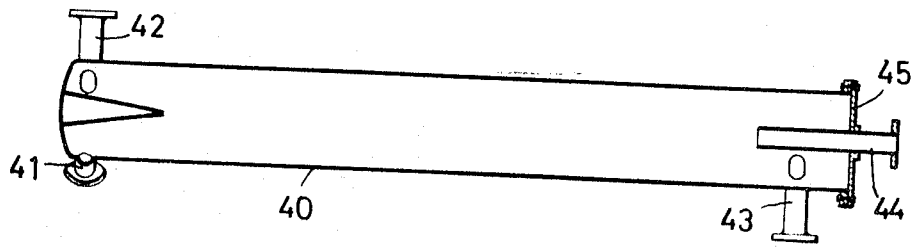

3,660,366
POLYMERIZATION PROCESS
Tatsuo Horie, Tokyo, Tatsuo Fuchigami, Kawasaki-shi, and Mitsuo Okazawa, Yokohama-shi, Japan, assignors to Nippon Petrochemicals Co., Ltd., Tokyo, Japan
Filed Sept. 4, 1968, Ser. No. 757,390
Claims priority, application Japan, Sept. 8, 1967, 42/57,282, 42/57,441
Int. Cl. C08f 15/04; C08d 3/02
U.S. Cl. 260—85.3
16 Claims

ABSTRACT OF THE DISCLOSURE

A polymerization process in which the polymerization product is insoluble in the reaction mixture and the specific gravity of said product is smaller than that of the reaction mixture. In said polymerization reaction, the raw materials are fed into the reaction apparatus, so as to cause rotating current along the length of the apparatus, thus the lighter polymer is concentrated on the central position of the apparatus during the polymerization reaction and it is separated from the reaction mixture continuously. This apparatus can also be used for the reacted mixture after the reaction in order to separate the polymer in the mixture.

---

The present invention relates to a polymerization process. Further, the present invention relates to said polymerization process in which the polymerization product is insoluble in the reaction mixture and the specific gravity of the polymerization product is smaller than that of the liquid phase reaction media.

A great variety of investigations with regard to polymerization reaction procedures employing various reaction methods and reaction apparatus have been carried out. These investigations pertain to processes concerning the feed of the catalyst, the feed of the monomer and medium, the supply and removal of heat, stirring, regulation of concentrations of the monomers and polymerization products, the regulation of temperature and viscosity in the reaction systems, regulation of residence time of the reaction materials, and the removal of the polymerization products, un-reacted materials and media from the reaction.

These investigations further relate to the method of solution to the problems regarding the nature of polymerization reaction, for instance the velocity of the polymerization reaction, the temperature and pressure of the polymerization reaction. Also, homogeneous polymerization reaction systems and heterogeneous polymerization reaction systems have been studied. Likewise, the solubility of polymer products in the reaction system has been studied, as well as the molecular weight of the polymer product, the stickiness of polymer, the specific gravity of the polymer, the viscosity of reaction system, etc.

However, no sufficient improvement has been proposed with regard to a polymerization reaction in which the polymerization product is insoluble in the reaction system and the specific gravity of the product is smaller than that of the liquid phase reaction system. Further, in the case of the polymerization product being sticky, many problems remain unsolved, the only significant contribution being made has been a reaction vessel with stirrer and a draft tube type reaction vessel proposed in U.S. Patent specification No. 2,636,026 for each polymerization reaction.

Furthermore, in regard to the separating of the polymerization product after the reaction, the method of sweeping out the polymerization product continuously by using an endless belt conveyor having a bowl shape or oval bowl shape caterpillar plates, and the method of separating the polymerization product by using a sieve have been suggested in U.S. patent specification Nos. 2,085,524 and 2,436,767. However, efficient separation can not be carried out with polymers of certain particle size ranges employing these methods.

Moreover, in the case of using the apparatus suggested by these methods, the inside wall of the apparatus is stained by the polymerization product because the polymer is sticky, so that the heat transfer and flow of materials are hindered. And further, in the case of the use of a reaction apparatus with a stirrer, there has been considerable difficulty in sealing the shaft of the stirrer, especially when the reaction proceeds under high temperature, low temperature or high pressure.

The object of the present invention is to provide an improved method of polymerization in order to remove these disadvantages as aforementioned, wherein ordinary, well known reaction apparatus or separation apparatus are employed in the polymerization procedure.

Another object of the present invention is to provide an effective method of polymerization in which the quantity of the reaction medium can be decreased substantially, which is recycled through separating, recovering and refining steps, by means of taking out the polymerization product which is in a higher concentration than that of the polymer in the reaction system.

A further object of the present invention is to provide an improved method of polymerization reaction in the case of the polymerization product being sticky in which the decrease of heat transfer and blocking of the apparatus can be prevented by means of concentrating the reaction product to the central axis position of the apparatus.

A still further object of the present invention is to provide an improved method of polymerization in which the concentration of the polymerization product is increased or the polymerizataion product is substantially separated from the liquid phase of the reaction system before subjecting the reaction mixture thus-produced to the subsequent treating steps such as a flashing step, a washing step, etc. Thus, facilitating the procedure of carrying out these steps.

A still further object of the present invention is to provide an improved method of polymerization in which the heat of the reaction system can be easily recovered by heat exchange from the separated liquid portion when the polymerization reaction is carried out under heated or cooled conditions.

This invention relates to a method of accomplishing these objects by applying an improved cyclon apparatus. In the ordinary cyclon apparatus, the solid material which is higher in its specific gravity is separated by centrifugal force to the outer wall position. In the present invention however, the solid material which is lower in its specific gravity than that of the liquid phase is on the central position of the apparatus to be separated. Thus, fundamental differences exist in the relationship of the specific gravities between the materials in the system to be separated and in the usage of the apparatus.

In order to carry out these objects in accordance with the present invention, a hollow body of revolution with caps on both ends is employed which is round in its section, one end of said body being provided with one or more inlets for monomers, catalyst and reaction media, or for reacted mixture, the other end of said body being provided with an outlet for the separated liquid phase portion, the central axis position of one of the ends of said body being provided with an outlet for concentrated or separated polymerization product. Said inlets are attached to said body in tangential direction with regard to the section of said body and said outlet for the polymer may be or may not be projected into the inside of the body. Also, said outlets for the separated liquid phase are preferably attached to said body in a tangential direction with regard to the section of said body to obtain a more concentrated polymerization product from said outlets for the polymer.

To employ said apparatus, monomers, catalyst and reaction media, or reacted mixture is fed into the body through said tangential inlets and is rotated by the feeding current in the body. The linear velocity of the feeding material is preferable above 1 m./sec. Thus, the portion being smaller in its specific gravity containing the bulk of the polymerization product and the portion being larger in its specific gravity containing less or no polymerization product are separated. The former is concentrated in the central axis position and is taken out from said outlet for the polymerization product and the latter is taken out from said outlets for separated liquid phase portion.

The present invention may be utilized in a polymerization reaction in which the polymerization product is substantially not soluble in the liquid phase and the specific gravity of said product is smaller than that of the liquid phase, i.e., the mixture of monomer and reaction media.

A polymerization reaction with high reaction velocity is preferable when the method of the present invention is employed. That is, the polymerization reaction may be completed while monomers, catalyst and reaction media are fed into the apparatus through the inlets and flow through the apparatus with rotation and then the reacted mixture is taken out from the outlets.

The polymerization reaction in accordance with the present invention may be a radical polymerization or an ionic polymerization method using various monomers. Among these reactions, the most typical ones are polymerization of isoolefins and co-polymerization of isoolefins and other unsaturated hydrocarbons having 4–10 carbon atoms using a Friedel-Crafts catalyst, a $BF_3$-metal alkoxide system catalyst or an organometallic catalyst, and hydrocarbon halides as the reaction media at a temperature below 0° C.

The present invention may also be utilized in a polymerization process in which the concentration of the polymerization product is increased or the polymerization product is substantially separated from the liquid phase of the reaction mixture which has been produced by an ordinary polymerization step before subjecting the reaction mixture to the following steps such as flashing, washing, etc.

The aforementioned hollow body of revolution being round in its section includes a hollow cylinder, a hollow circular cone, a hollow truncated cone, a part of a hollow sphere, and other columnar tubes and combinations thereof.

In the present invention, the section of the reaction apparatus is to be round because the raw materials of the reaction in the apparatus must be rotated effectively so as to separate the polymerization product which is taken out from the outlet.

In order to produce the rotating current effectively, a proper projection or groove may be provided continuously on the inner wall of the apparatus in the form of screw thread.

The energy of the rotating current is caused by the relatively large linear velocity of the monomer, catalyst and reaction media or reacted mixture which are introduced through the inlets into the apparatus. These materials are fed into the apparatus through the inlets in a linear velocity of 1 to 2 m./sec. or more. The inlets of the apparatus are provided in the tangential direction of the section of the apparatus, and on the central axis position of the end where the inlets are provided, and a current guiding cone is preferably provided directing its top to the center of the hollow tube. By this guiding cone, the rotating current is promoted in the apparatus effectively.

In this invention it is more preferable that the difference between the specific gravity of the polymer and reaction mixture is from 0.005 to 0.5. Below 0.005, it is difficult to obtain enough concentrated polymerization product. Also, it is more preferable that the particle size of the polymer be above 50 microns. Below 50 microns, a sufficient concentrated polymerization product is not obtained efficiently, but it is a characteristic feature of this invention that the concentration or separation of the polymer is carried out efficiently even if the polymer has a very small particle size, for example, from 80–1,000 microns.

In this invention, two or more apparatuses of the present invention can be used by combining them in parallel and/or in series.

These and other objects and features of the present invention will be better understood upon consideration of the following description and the accompanying drawings in which:

FIG. 1 is a vertical sectional front view of an apparatus of the present invention;

FIG. 2 is a vertical sectional side view of the apparatus taken on the line II—II in FIG. 1;

FIG. 3 is a vertical sectional side view of the apparatus taken on the line III—III in FIG. 1;

FIG. 4 is a vertical sectional front view of another apparatus of the invention.

Figure 5:
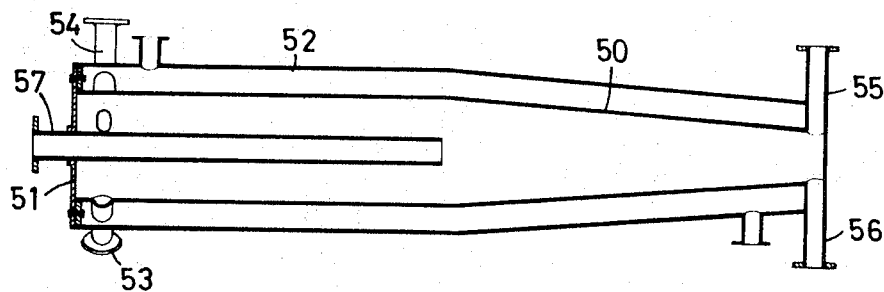
FIGS. 5 to 7, inclusive, are vertical sectional front views of other apparatus in accordance with the present invention.

In FIG. 1, 1 is an apparatus in accordance with the present invention which is closed at one end and the other end is also closed with a cap plate 3. The apparatus 1 is provided with a jacket 2 which is divided into three rooms by partitions 4. Each room of said jacket 2 is provided with inlet and outlet pipes 5 so as to supply a heat transfer medium to heat or cool the apparatus. Further an expansion ring 9 is provided in order to meet the heat expansion of the apparatus.

The method of the present invention will be explained using the apparatus shown in FIG. 1. As raw materials, monomer catalyst and reaction medium are fed into the apparatus 1 through the inlets 6a, 6b and 6c (see FIG. 2) under the linear velocity of about 1.0 to 2.0 m./sec. or more. The introduced monomer, catalyst and reaction medium flow rotating around the guide cone 8 and are mixed completely and advance ahead by the feeding current. The reaction mixture passing through the apparatus against the other end, the polymerization reaction is proceed continuously. The reaction temperature in the reaction system can be properly maintained by supplying a heat transfer medium into said jacket 2. Further, the jacket 2 is divided into three rooms by partitions 4, so that the temperature of the reaction mixture can be regulated in proportion to the advance of the polymerization reaction in the apparatus. It will be very much convenient in the course of proceeding the reaction.

The specific gravity of the polymerization product being formed in the aforementioned step is smaller than that of the liquid phase in the reaction system, so that the effect of centrifugal force on the polymerization product caused by the rotating current is smaller than that of the liquid phase, therefore, the produced polymer gathers to the central axis position of the apparatus and is separated substantially from the liquid phase. The separated polymer lines up on the central axis of the apparatus and is taken out continuously from the outlet 10 in the form of slurry being suspended by the liquid phase. The concentration of the slurry of the polymer can be controlled optionally, so that a sufficiently concentrated polymer can be taken out. The greater part of the liquid phase being separated from the polymer is taken out from the outlet 11 which is attached to the tangential direction of the section of the apparatus.

In the former continuous polymerization reaction of this kind, the reacted mixture of polymer, un-reacted monomer and reaction medium is once taken out as it is, and the polymer is separated by a series of steps such as flashing, catalyst removing and rinsing, and at the same time un-reacted monomer and reaction medium are recovered, further they are recycled to the polymerization process through refining steps and heating or cooling steps.

In the process of the present invention, the recovered material containing less polymer can be directly recycled into the reaction apparatus. Thus the costs for heat exchange recovering and refining of reaction medium and un-reacted monomer can be reduced.

Further, in the former process of this kind, in the case of the polymer being sticky, the polymer sticks on the wall of the reaction vessel and proper heat transfer and flowing of the contents are hindered. Therefore, operation of the reaction apparatus can be carried out continuously for a long term. However, the apparatus of the present invention has its characteristic feature in that the sticky polymer is concentrated in the central axis position of said body, where it is most distant from the wall of the reaction apparatus, and therefore is not in contact with the wall portion. Moreover, any polymer which happens to stick on the wall can be removed by the existence of strong rotating current. Therefore, constant and long term operation of the apparatus 1 of the present invention can be expected without any troubles.

An effective concentrating or separating operation of the polymer after the polymerization reaction can also be carried out by connecting the apparatus of the present invention as shown in FIGS. 1 to 3 to an ordinary polymerization reaction vessel and supplying the reacted mixture into one or more of the inlets 6a, 6b and 6c.

In this case, the aforementioned characteristic features can be expected, too.

Further, in a case of the polymer having a very small particle size, for example from 100 to 1000 microns, the separation of the polymer during the reaction or after the reaction can be carried out effectively. Also, in the case of the polymer having a wide range distribution of the particle size, for example from 50 microns to 10 or more millimetres, not only separation but also classification can be carried out.

In FIGS. 4 to 7, there are shown other apparatuses of the present invention in order to further illustrate the features of the present invention.

In FIG. 4, one end of the hollow body 40 is closed and the other end of the tube is also closed by a cap plate 45. Inlets 41 and 42 are provided at the one end in a tangential direction around the round section of the body. An outlet 43 for liquid reaction materials is provided at the other end of the body 40, and an outlet 44 for the polymerization product is provided at the center of said cap plate 45. The outlet 44 is not projected into the body 40.

In FIG. 5, the hollow body 50 is partially conical and it is provided with a cap plate 51 at the end near inlets 53 and 54. Around the body 50, a jacket 52 is provided. The numerals 55 and 56 indicate outlets for the liquid phase of the reaction mixture. The outlet 57 for polymerization product is provided on the center of said cap plate 51 and is projected into the body on the side near inlets. The projected portion of the outlet 57 into the body 50 serves as a guide cone as that shown in FIG. 1, numeral 8.

Figure 6:
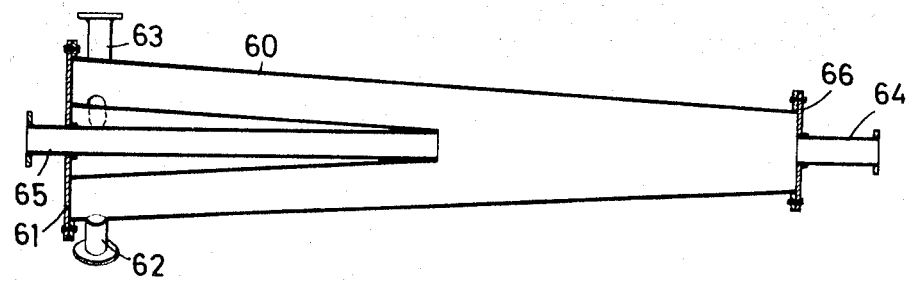

In FIG. 6, the hollow truncated cone 60 is provided with cap plates 61 and 66 on the both ends.

The numerals 62 and 63 are inlets and 64 is an outlet for the liquid reaction materials. The outlet 65 for the polymerization product is provided on the central position of the said cap plate 61 on the side near the inlets 62 and 63, and is projected into the body.

Figure 7:
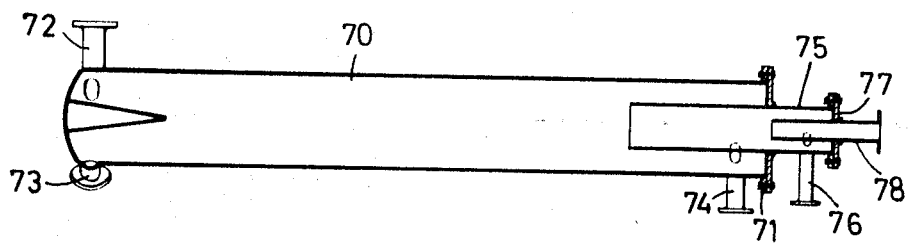

In FIG. 7, one end of the hollow body 70 is closed and the other end of the body is also closed by a cap plate 71. The numerals 72 and 73 are inlets, 74 is outlet, and 75 is an outlet for polymer. The outer end of the outlet 75 is closed by a plate 77 and the outlet 75 is provided with other outlets 76 and 78. In the practical operation, the portion containing the major portion of the polymer is introduced into the outlet 75, and in the outlet 75, further separation is taken place by the rotating current, thus the most concentrated portion may be taken out from the outlet 78 and the portion with low concentration is taken out from the outlet 76. In this apparatus, a classification in accordance with the particle size of the polymer can be carried out.

As can be understood from the aforementioned structures, the structure of the apparatus of the present invention is very simple and manufacture of the apparatus is easy. The apparatus mainly consists of a hollow body of revolution, so that the designing of the apparatus is easy and the amount of materials to be used is smaller as compared with the apparatus of other types. Further, the volume of the apparatus is small and it can be installed any direction, vertical, horizontal or slant without any disadvantages.

In the following, the present invention is explained by way of examples, however, they are intend as merely illustrative and in no way restrictive of the invention.

EXAMPLE 1

By using an apparatus as shown in FIG. 1 to FIG. 3, inclusive, isobutylene and isoprene are caused to copolymerize by using boron trifluoride as a catalyst and methyl chloride as a reaction medium. The diameter of the apparatus 1 is 52.7 mm. and the length thereof is 120 cm. The outlet 10 for the polymer is projected into the apparatus by 5.0 cm. As a coolant, liquid ethylene is supplied into the jacket 2 through the connecting pipe 5.

Isobutylene containing 3% of isoprene is cooled to −80° C. and introduced into the inlet 6a at the rate of 300 g./min., methyl chloride as the reaction medium is fed through the inlet 6b at the rate of 1700 g./min., and gaseous boron trifluoride is fed through the inlet 6c at the rate of 3.5 millimole/min. The top of the inlet 6c is provided with a nozzle for gas supply (not illustrated).

From the outlet 10, a mixture of methyl chloride containing 102 g./min. of polymer and 217 g./min. of un-reacted monomer is obtained. From the other outlet 11, 1680 g./min. of the mixture of methyl chloride containing un-reacted monomer and 2% by weight of polymer is recovered. The polymer which is taken out from the outlet 10 is recovered by the ordinary method.

The viscosity-average molecular weight of the polymer obtained is 250,000 and the degree of unsaturation defined by iodine titration method (Anal. Chem. 29, 751 (1857)) is 1.5.

After the operation more than 50 hours, contamination of the apparatus caused by the produced polymer is very little.

EXAMPLE 2

A reacted mixture, which has been obtained by copolymerizing isobutylene with isoprene using ordinary polymerization apparatus under the condition of −90° C. with boron trifluoride as the catalyst, and contains 76.7% by weight of methyl chloride, 3.3% by weight of unreacted monomer and 20.0% by weight of polymer, is fed into the inlets 53 and 54 as shown in FIG. 5, at the rate of 30 lit./min. as total. The apparatus used is 70 cm. in its length and 5 cm. in its diameter.

The reaction mixture fed into the said apparatus brings about rotating current, thus the polymerization product concentrates to the central axis position of the apparatus and is taken out from the outlet 57 at the rate of 14.9 lit./min. The mixture from the outlet 57 contains 39.5% by weight of polymer and 60.5% by weight of reaction medium and un-reacted monomer. While from the outlets 55 and 56, 15.1 lit./min. of the mixture of reaction medium and un-reacted monomer containing 1.5% by weight of polymer is recovered. The temperature of said recovered mixture of reaction medium and un-reacted monomer is −85° C. and it can be directly recycled to polymerization system.

The above operation can be carried out for more than 50 hours without any substantial trouble such as blocking of the the apparatus by the polymer.

What is claimed is:

1. A polymerization process in which the polymerization product is insoluble in the reaction mixture and the specific gravity of said product is smaller than that of the reaction mixture, employing a reaction apparatus consisting of a hollow body of revolution being closed at the both ends, one or more of inlets being provided on the periphery of one end of said body in tangential direction, one or more of outlets being provided at the other end of said body, one or more of outlets for the polymer produced being provided at the central axis position of one end of the both ends of said body, and being characterized in that monomer, catalyst and reaction medium are fed into said inlets, said fed raw materials are caused to rotate by the feeding current and are advanced ahead in said body while being caused to react, and the polymerization product having smaller specific gravity than that of the reaction mixture is concentrated to the central axis position of said body to be taken out from said outlet for the polymer product and the portion containing less polymerization product having larger specific gravity being taken out from said other outlets.

2. A polymerization process according to claim 1 wherein said hollow body of revolution is one selected from the group consisting of a hollow cylinder, a hollow truncated cone and combination of a hollow cylinder and a hollow truncated cone.

3. A polymerization process according to claim 1 wherein said outlets for the portion containing less polymerization product are attached to said body in tangential direction with regard to the section of said body.

4. A polymerization process according to claim 1 wherein said hollow body of revolution is provided with a guiding cone at the center of the end on the side of said inlets of said body.

5. A polymerization process according to claim 1 wherein the difference of specific gravity of the polymerization product and reaction mixture is from 0.005 to 0.5, the particle size of the polymerization product is from 50 microns to about 10 millimeters, and the linear velocity of the raw material fed from inlets is above 1 m./sec.

6. A polymerization process according to claim 1 wherein isoolefin and diolefin having 4–10 carbon atoms are copolymerized using hydrocarbon halide as a reaction medium in cationic polymerization system at a temperature from the boiling point of ethylene to 0° C.

7. A polymerization process according to claim 1 wherein isoolefin is polymerized using hydrocarbon halide as reaction medium in a cationic polymerization system at a temperature from the boiling point of ethylene to 0° C.

8. A polymerization process according to claim 1 wherein said portion containing less polymerization product obtained from outlets is recycled to the inlets of said body.

9. A polymerization process in which the polymerization product is insoluble in the reaction mixture and the specific gravity of said product is smaller than that of the reaction mixture, employing an apparatus consisting of a hollow body of revolution being closed at the both ends, one or more of inlets being provided on the periphery of one end of said body in tangential direction, one or more of outlets being provided at the other end of said body, one or more of outlets for the polymer produced being provided at the central axis position of one end of the both ends of said body and being characterized in that reacted mixture which has been produced by ordinary polymerization step is fed into said inlets, said fed mixture is caused to rotate by the feeding current and are advanced ahead in said body, and the polymerization product having smaller specific gravity than that of the reaction mixture is concentrated to the central position of said body to be taken out from said outlet for polymer product, and the portion containing less polymerization product having larger specific gravity being taken out from said other outlets.

10. A polymerization process according to claim 9 wherein said hollow body of revolution is one selected from the group consisting of a hollow cylinder, a hollow truncated cone and combination of a hollow cylinder and a hollow truncated cone.

11. A polymerization process according to claim 9 wherein said outlets for the portion containing less polymerization product are attached to said body in tangential direction with regard to the section of said body.

12. A polymerization process according to claim 9 wherein said hollow body of revolution is provided with a guiding cone at the center of the end on the side of said inlets of said body.

13. A polymerization process according to claim 9 wherein the different of specific gravity of the polymerization product and reaction mixture is from 0.005 to 0.5, the particle size of the polymerization product is from 50 microns to about 10 millimeters, and the linear velocity of said reacted mixture fed from inlets is above 1 m./sec.

14. A polymerization process according to claim 9 wherein said reacted mixture is slurry solution obtained by copolymerizing isoolefin and diolefin having 4–10 carbon atoms using hydrocarbon halide as reaction medium in cationic polymerization system.

15. A polymerization process according to claim 9 wherein said reacted mixture is slurry solution obtained by polymerizing isoolefin using hydrocarbon halide as reaction medium in cationic polymerization system.

16. A polymerization process according to claim 14 wherein said isoolefin is isobutylene, diolefin is isoprene, and reaction medium is methyl chloride.

References Cited
UNITED STATES PATENTS

| | | | |
|---|---|---|---|
| 2,374,518 | 4/1945 | Wolk et al. | 196—52 |
| 2,999,084 | 9/1961 | Arnold et al. | 260—85.3 |

JOSEPH L. SCHOFER, Primary Examiner

R. A. GAITHER, Assistant Examiner

U.S. Cl. X.R.

260—95